(12) United States Patent
Bae et al.

(10) Patent No.: US 11,128,440 B2
(45) Date of Patent: Sep. 21, 2021

(54) BLOCKCHAIN BASED FILE MANAGEMENT SYSTEM AND METHOD THEREOF

(71) Applicant: SAMSUNG SDS CO., LTD., Seoul (KR)

(72) Inventors: Sang Ji Bae, Seoul (KR); Sang Jun Kang, Seoul (KR); Ki Woon Sung, Seoul (KR); Sang Won Lee, Seoul (KR); Kyu Sang Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 209 days.

(21) Appl. No.: 16/666,756

(22) Filed: Oct. 29, 2019

(65) Prior Publication Data

US 2021/0126771 A1    Apr. 29, 2021

(30) Foreign Application Priority Data

Oct. 29, 2019 (KR) .......................... 10-2019-0135601

(51) Int. Cl.
  *H04L 9/06* (2006.01)
  *G06F 21/60* (2013.01)
  (Continued)

(52) U.S. Cl.
  CPC .......... *H04L 9/0637* (2013.01); *G06F 21/602* (2013.01); *H04L 9/30* (2013.01); *H04L 63/0428* (2013.01); *H04L 2209/38* (2013.01)

(58) Field of Classification Search
  CPC ..... H04L 9/0637; H04L 9/30; H04L 63/0428; H04L 2209/38; H04L 67/06;
  (Continued)

(56) References Cited

U.S. PATENT DOCUMENTS 7,254,837 B2 * 8/2007 Fields .................. G06F 21/606
                                              709/203
7,406,484 B1 * 7/2008 Srinivasan .......... H04L 41/0803
  (Continued)

FOREIGN PATENT DOCUMENTS

CN        107846282 B  * 11/2017
CN        110968554 A  *  4/2020
KR        20190076197 A *  7/2019    .......... H04L 67/104

*Primary Examiner* — Shahriar Zarrineh
(74) *Attorney, Agent, or Firm* — The PL Law Group, PLLC

(57) ABSTRACT

A file transmission method includes storing each chunk of a target file by public cloud, receiving, by the first node, a file transmission request including an encrypted chunk order sheet of the target file, information on the target file and recipient information, wherein the chunk order sheet includes connection order information of each chunk necessary for restoring the target file, and the encrypted chunk order sheet is encrypted with a public key of a recipient, storing a first transaction including information included in the file transmission request and chunk storage location information in a ledger stored in the first node, storing, by the second node, the first transaction in a ledger of the second node according to synchronization of the ledger, storing a chunk in the internal storage using the chunk storage location information when the recipient information included in the first transaction includes a user belonging to the intranet.

13 Claims, 9 Drawing Sheets

(51) Int. Cl.
*H04L 9/30* (2006.01)
*H04L 29/06* (2006.01)

(58) Field of Classification Search
CPC . H04L 67/1097; H04L 9/0825; G06F 21/602; G06F 2221/2107; G06F 21/645; G06F 21/606
See application file for complete search history.

(56) References Cited

U.S. PATENT DOCUMENTS

| | | | | |
|---|---|---|---|---|
| 7,546,427 | B2* | 6/2009 | Gladwin | G06F 11/1076 711/154 |
| 9,037,856 | B2* | 5/2015 | Bestler | H04L 9/0863 713/167 |
| 9,374,395 | B2* | 6/2016 | Barton | G06F 16/951 |
| 9,633,064 | B2* | 4/2017 | Gokhale | G06F 11/1464 |
| 10,114,969 | B1* | 10/2018 | Chaney | H04L 9/3247 |
| 10,491,378 | B2* | 11/2019 | Binning | H04L 63/12 |
| 10,607,027 | B1* | 3/2020 | Ben Naim | H04L 9/14 |
| 2005/0015404 | A1* | 1/2005 | Cherkasova | H04L 67/1095 |
| 2009/0222509 | A1* | 9/2009 | King | H04L 67/1097 709/203 |
| 2011/0055277 | A1* | 3/2011 | Resch | H04L 63/20 707/785 |
| 2011/0067115 | A1* | 3/2011 | Cappio | G06Q 30/02 726/29 |
| 2011/0071841 | A1* | 3/2011 | Fomenko | G06F 16/1834 705/1.1 |
| 2011/0185019 | A1* | 7/2011 | Peters | H04N 21/442 709/203 |
| 2011/0225209 | A1* | 9/2011 | Volvovski | G06F 16/122 707/803 |
| 2012/0072723 | A1* | 3/2012 | Orsini | H04L 63/10 713/165 |
| 2016/0275303 | A1* | 9/2016 | Narayanaswamy | H04L 63/1458 |
| 2016/0292429 | A1* | 10/2016 | Manville | G06F 16/1748 |
| 2017/0272209 | A1* | 9/2017 | Yanovsky | H04L 67/1097 |
| 2018/0124565 | A1 | 5/2018 | Justin | |
| 2018/0139042 | A1* | 5/2018 | Binning | H04L 9/3297 |
| 2018/0167217 | A1* | 6/2018 | Brady | H04L 67/10 |
| 2018/0351830 | A1* | 12/2018 | Kenna, III | G06F 16/958 |
| 2019/0036895 | A1* | 1/2019 | Irvine | H04L 9/0877 |
| 2019/0057115 | A1* | 2/2019 | Liu | H04L 9/3263 |
| 2019/0068615 | A1* | 2/2019 | Pack | H04L 9/3236 |
| 2019/0149594 | A1* | 5/2019 | Kwon | H04L 63/0464 709/231 |
| 2019/0311148 | A1* | 10/2019 | Andrade | H04L 63/102 |
| 2019/0342084 | A1* | 11/2019 | Mehedy | H04L 9/0643 |
| 2020/0073560 | A1* | 3/2020 | Adanve | G16B 50/30 |
| 2020/0363994 | A1* | 11/2020 | Jing | H04L 9/3236 |

\* cited by examiner

BLOCKCHAIN BASED FILE MANAGEMENT SYSTEM AND METHOD THEREOF

CROSS REFERENCE TO RELATED APPLICATIONS AND CLAIM OF PRIORITY

This application claims the benefit of Korean Patent Application No. 10-2019-0135601 filed on Oct. 29, 2019 in the Korean Intellectual Property Office, the disclosure of which is incorporated herein by reference in its entirety.

1. FIELD

The present invention relates to a blockchain based file transmission method and system thereof. More specifically, the present invention relates to a method and system for incorporating a blockchain in order to secure stability in transmitting and receiving files between storages inside an intranet and a public cloud located outside the intranet.

2. DESCRIPTION OF THE RELATED ART

Computational resources belonging to an organization such as an enterprise are located inside an intranet, and the intranet maintains a high level of security through a firewall or the like. On the other hand, since the public cloud system has the technology purpose that allows anyone to use it, the security level is low compared to the computational resources inside the intranet. For example, if the location of a file stored in a cloud storage is exposed, there is a risk that the file will be stolen.

Nevertheless, it is impossible to completely block transmission and reception of files between computing resources inside the intranet and public cloud systems outside the intranet. Since large files are virtually difficult to attach to e-mail, the demand for online large file transfers to recipients inside the intranet will continue to exist.

However, in order to achieve the large file transfer, whenever a file is transmitted from the public cloud system into the intranet, actions, such as the address of the cloud storage where the file is stored is notified and the intranet firewall is temporarily opened for the address, are required. Such actions may not only be inconvenient to use, but also pose a security threat to the intranet.

Meanwhile, blockchain means data management technology, in which continuously increasing data is recorded in a specific unit of block and each blockchain node constituting a peer-to-peer (P2P) network manages the block in a chain-type data structure, or data structure itself. Blockchain technology can ensure the integrity and security of transactions through a consensus process, in which all blockchain nodes belonging to the network record and verify transactions.

Data recorded in the blockchain is referred to as on-chain data and data managed based on blockchain technology but not recorded in the blockchain is referred to as off-chain data. Files stored in storage devices can also be thought of as some kind of off-chain data. There is a need to provide a technique that removes security risks by combining files as off-chain data and on-chain data and transmitting and receiving files between storages inside an intranet and a public cloud located outside the intranet.

SUMMARY

Some embodiments of the present invention are to provide a method and a system that can safely transmit and receive files between a user inside the intranet and a user outside the intranet.

Some embodiments of the present invention are to provide a method and a system, in which a file is divided into chunks and transmitted and only the recipient can restore the original file.

Some embodiments of the present invention are to provide a blockchain based file transmission and reception method and a system thereof.

Some embodiments of the present invention are to provide a file transmission and reception method between the public cloud and the intranet, which can provide security for files stored in the public cloud with low cost for the file download of the recipient.

Some embodiments of the present invention are to provide a file transmission and reception method and a system thereof, in which when transmitting a file to a plurality of recipients, it is guaranteed through the blockchain that the same file is simultaneously transmitted to all recipients.

Embodiments of the present invention are not limited to the above-mentioned embodiments, and other embodiments not mentioned will be clearly understood by those skilled in the art from the following description.

In an embodiment, a file transmission method between a public cloud and an intranet performed in a system comprising a blockchain network including a second node inside an intranet and a first node outside the intranet, a public cloud and an internal storage inside the intranet is provided. The method comprises storing each chunk of a target file by the public cloud, receiving, by the first node, a file transmission request including an encrypted chunk order sheet of the target file, information on the target file and recipient information, wherein the chunk order sheet includes connection order information of each chunk necessary for restoring the target file, and the encrypted chunk order sheet is encrypted with a public key of a recipient, storing a first transaction including information included in the file transmission request and chunk storage location information in a ledger stored in the first node, storing, by the second node, the first transaction in a ledger of the second node according to synchronization of the ledger, storing a chunk of the target file received from the public cloud in the internal storage using the chunk storage location information of the first transaction when the recipient information included in the first transaction includes a user belonging to the intranet and decrypting the encrypted chunk order sheet using a private key of the recipient and restoring the target file by connecting chunks of the target file stored in the public cloud in an order according to the decrypted chunk order sheet. The receiving the file transmission request may comprise receiving a file transmission request comprising recipient information including information on a plurality of recipients and information on the target file common to all recipients. Further, the first transaction may comprise an encrypted chunk order sheet for each recipient encrypted with a public key of each of recipients, the chunk storage location information and the recipient information.

In one embodiment, the file may have multiple recipients. In this case, the receiving of the file transmission request may comprise receiving a file transmission request comprising receiver information including information on a plurality of recipients and information on the target file common to all receivers. The first transaction may comprise an encrypted chunk order sheet for each receiver, which is encrypted with the public keys of the respective receivers, the chunk storage location information, and the receiver information. Further, the blockchain network may be a consortium network, in which a plurality of organizations participated. The blockchain network may further comprise a third node outside the intranet, wherein the first node is a recording node (committing peer) belonging to a first organization of the plurality of organizations, the second node is a recording node belonging to a second organization of the plurality of organizations, and the third node is a recording node belonging to a third organization of the plurality of organizations, wherein the plurality of recipients includes a first recipient belonging to the second organization and a second recipient belonging to the third organization, wherein the first transaction includes an encrypted chunk order sheet encrypted with a public key of the first recipient, storage location information of a chunk according to a result of chunking performed for the first recipient, an encrypted chunk order sheet encrypted with a public key of the second recipient, storage location information of a chunk according to a result of chunking performed for the second recipient and the recipient information.

The public cloud may include physically separated N (N is a natural number equal to or more than 3) storage nodes, wherein the storing each chunk of the target file may comprise, dividing the target file into a plurality of chunks by a sender terminal, randomly mixing a location of each chunk by the sender terminal, dividing data according to a result of the random mixing into T (T is a natural number equal to or more than N+1) parts by the sender terminal and distributing and storing, by the public cloud, the respective parts or its copy in each of the storage nodes such that at least one part is omitted in one storage node. The chunk storage location information may include location information of each of the parts, wherein the storing a chunk of the target file in the internal storage comprises, sequentially connecting and storing each part of the target file in the internal storage by using location information of each part of the target file.

The distributing and storing the respective parts or its copy in each of the storage nodes such that at least one part is omitted in one storage node may comprise storing, by a storage node, the respective parts or its copy, to which parity data encrypted with a public key of the storage node is added. The public key of each of the storage nodes may be stored in the ledger.

The storing a chunk of the target file in the internal storage may comprise monitoring a ledger stored in the second node by a notification server inside the intranet and transmitting a control message to cause a chunk of the target file to be stored in the internal storage when the notification server detects that a first user belonging to the intranet is included in the recipient information included in the first transaction. The transmitting the control message may comprise, obtaining a confirmation of whether a file is received from a terminal of the first user in response to detecting that a first user belonging to the intranet is included in the recipient information included in the first transaction, and transmitting the control message by the notification server in response to obtaining the confirmation. The notification server may be a device included in the blockchain network, but not storing the ledger. The first transaction may further includes an internal storage storing type option value. The restoring the target file may comprise, transmitting, by the notification server, a control message to cause the target file to be restored immediately after a chunk of the target file is stored in the internal storage if the internal storage storing type option value is a value indicating a source file storing type.

According to another aspect of the present invention, there is provided a method of transmitting a file between a public cloud and an intranet. It may also be performed in a system comprising a blockchain network including a second node inside an intranet and a first node outside the intranet, a public cloud and an internal storage inside the intranet. The method comprises, dividing a target file into a plurality of chunks by a sender terminal inside the intranet, randomly mixing, by the sender terminal, a location of each chunk and encrypting a chunk order sheet reflecting the result with a public key of a second user who is a recipient, storing a second transaction including an encrypted chunk order sheet of the target file and recipient information in a ledger stored in the second node, storing the second transaction in a ledger of the first node according to synchronization of the ledger by the first node, distributing and storing the respective chunks received from the internal storage in each of the storage nodes by the public cloud and receiving, by the first node, chunk storage location information from the public cloud, and updating the second transaction such that the chunk storage location information is included in the second transaction.

The method may further comprise monitoring a ledger stored in the first node by a notification server outside the intranet and transmitting a notification message to a terminal of the second user when the notification server detects that a second user belonging to a monitoring target organization is included in the recipient information included in the second transaction. The notification message may include an encrypted chunk order sheet of the second transaction and the chunk storage location information. The method may further comprise decrypting, by a terminal of the second user, the encrypted chunk order sheet using a private key of the second user and connecting chunks of the target file stored in the public cloud in an order according to the decrypted chunk order sheet to restore the target file.

According to still another aspect of the present invention, there is provided a blockchain based file transmission system comprising, a first node located outside an intranet for receiving a file transmission request including information on a target file and recipient information and storing a first transaction including an encrypted chunk order sheet, chunk storage location information and recipient information of the target file in a ledger; wherein the encrypted chunk order sheet is encrypted with a public key of a recipient, a public cloud located outside the intranet for storing each chunk of the target file, a second node located inside the intranet for storing the first transaction in a ledger of the second node according to synchronization of the ledger and an internal storage located inside the intranet for storing a chunk of the target file received from the public cloud using the chunk storage location information of the first transaction when a user belonging to the intranet is included in the recipient information included in the first transaction. The target file may be restored by connecting chunks of the target file stored in the public cloud in an order according to the chunk order sheet decrypted using a private key of the recipient.

DETAILED DESCRIPTION

Figure 1:
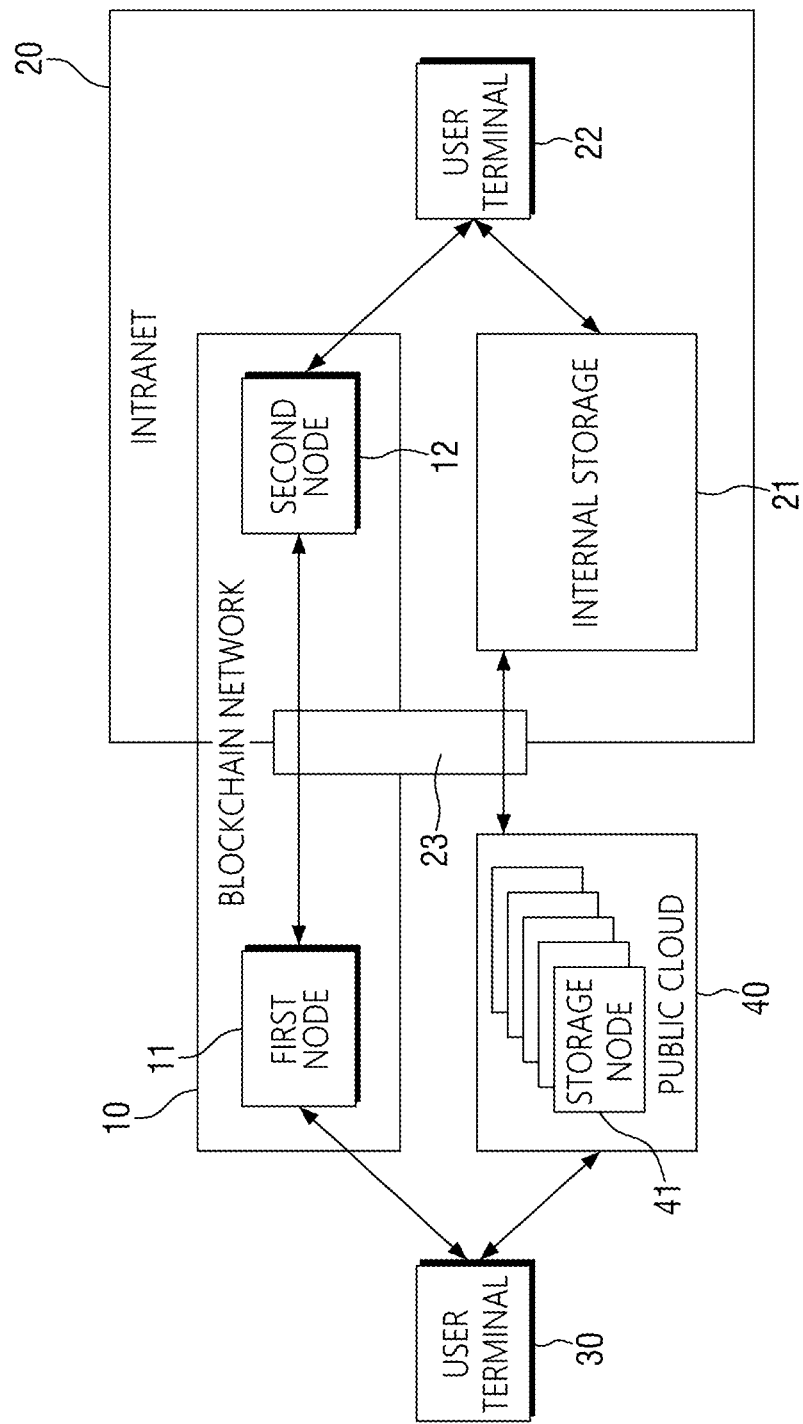
FIG. 1 is a block diagram of a blockchain based file transmission system according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a block diagram of a blockchain based file transmission system according to an embodiment of the present invention.

As shown in FIG. 1, the blockchain based file transmission system according to the present embodiment (hereinafter, abbreviated as 'file transmission system') may include blockchain nodes included in the blockchain network 10. The blockchain nodes include a first node 11 outside the intranet 20 and a second node 12 inside the intranet 20.

The blockchain nodes including the first node 11 and the second node 12 constitute a blockchain network 10 having a peer-to-peer (P2P) structure and operate according to a blockchain protocol. Each blockchain node 11, 12 can manage a ledger. In some embodiments, the ledger may include a blockchain, in which transaction data is recorded, and a state database (DB), in which a state record (e.g., a state value corresponding to a state key) is stored. Further, the transaction data may include a state record associated with the corresponding transaction. Each blockchain node 11, 12 can share a variety of smart contract and transaction data through the blockchain, and ensure the integrity and security of the transaction through the consensus process.

In some embodiments, the blockchain protocol may be a hyperledger fabric or a hyperledger fabric based application protocol.

The file transmission system according to the present embodiment may further include a public cloud 40 outside the intranet 20 and an internal storage 21 inside the intranet 20. The public cloud 40 includes a plurality of storage nodes 41. One storage node 41 may mean one physical storage device or may mean storage means logically identified as one storage device. That is, the public cloud 40 may be a storage system that provides an environment, in which a file may be divided into a plurality of chunks, distributed and stored in different storage nodes 41. Further, the public cloud 40 may be a storage system that can be accessed through a network and can secure access authority and a dedicated storage space through a membership subscription. The public cloud 40 may be a paid service or a free service, may be a closed service only for members of a specific organization or members of organizations belonging to a specific consortium, or may be an open service with no special restriction on membership.

In contrast, the internal storage 21 inside the intranet 20 may be a storage system accessible only by a computing device inside the intranet 20. For example, the intranet 20 may be protected by a firewall (not shown). The internal storage 21 also may be comprised of a plurality of storage nodes (not shown).

The firewall provides an open communication channel 23 so that P2P communication between nodes 11 and 12 belonging to the blockchain network 10 is not blocked. The communication channel 23 may be, for example, having a specific port, and in order to prevent indiscriminate transmission and reception of the packet using the specific port, the sender or receiver of the packet that may be transmitted or received through the communication channel 23 may be limited to the one previously specified. As illustrated in FIG. 1, the first node 11 and the second node 12 may perform P2P communication between blockchain nodes through a communication channel 23, and a public cloud 40 and an internal storage 21 may also perform data transmission and reception through the communication channel 23 for file transmission and reception according to some embodiments of the present invention.

Figure 2:
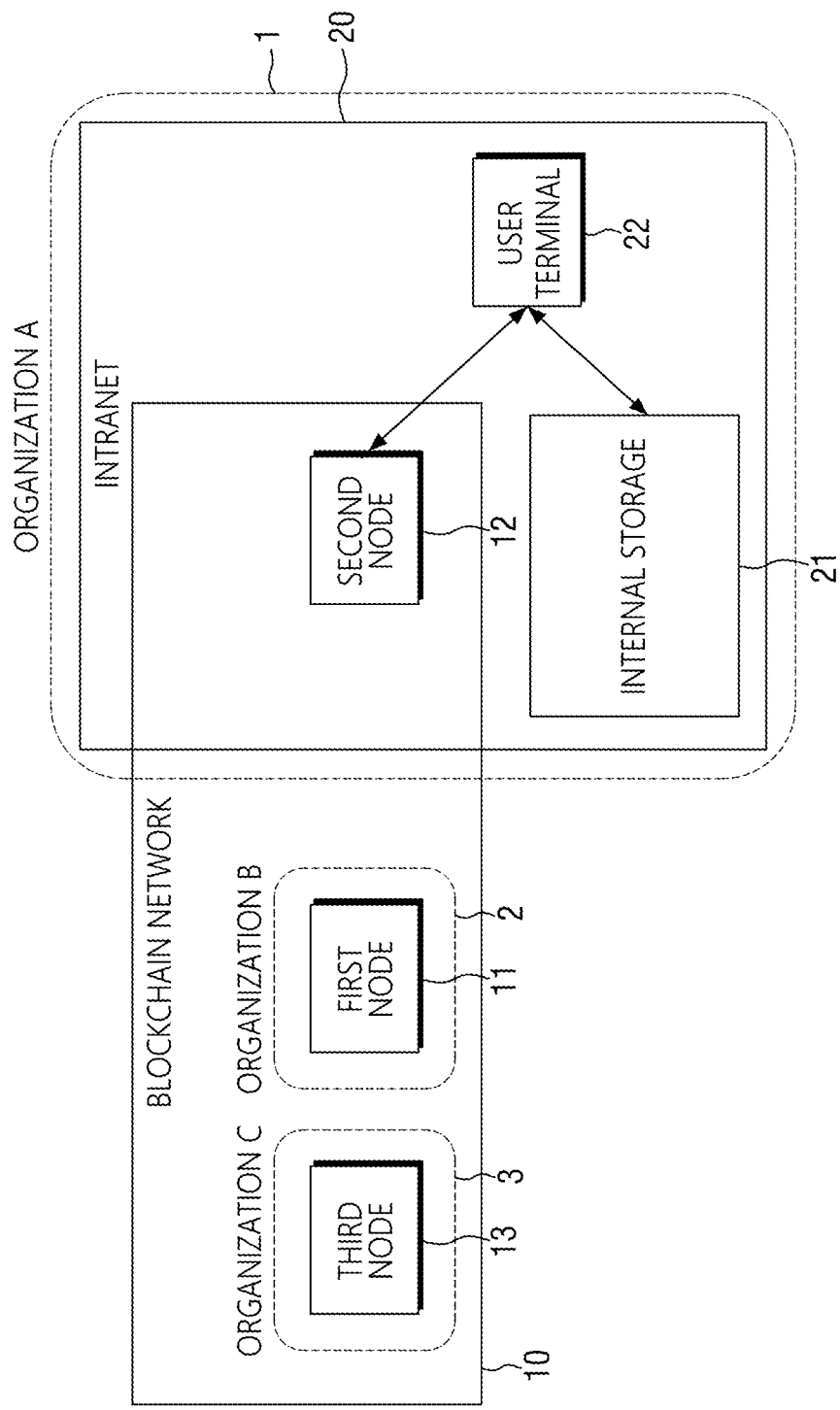
FIG. 2 is a block diagram illustrating a case, where a consortium blockchain is reflected in the blockchain based file transmission system described with reference to FIG. 1.

Referring to FIG. 2, the modified structure of the file transmission system according to the present embodiment will be described. The file transmission system of the modified structure described with reference to FIG. 2 supports the blockchain network 10, which is a blockchain in the form of a consortium blockchain.

The consortium blockchain is that a plurality of different organizations participate in and constitute a blockchain. That is, the consortium blockchain is constituted with nodes belonging to various organizations. The blockchain network 10 in the form of a consortium blockchain includes a first node 11 of organization B 2, a third node 13 of organization C 3 and a second node 12 of organization A 1.

The organization A 1 may be assumed to be an organization that is responsible for outsourcing, such as external management or monitoring of transactions generated by the organization B 2 and the organization C 3. If so, there will be a demand for file transmission and reception between the organization A 1 and other organizations 2, 3. Of course, storing a file to be shared between the organization A 1 and the other organizations 2, 3 in the ledger of the blockchain network 10 may be considered, but even if the size of the file is a little larger, it is not efficient to include the file itself as on-chain data. Some embodiments of the present invention may be understood as a file transmission and reception method between an organization 1, which plays an outsourcing role, such as external management or monitoring of a consortium blockchain, and external organizations 2, 3 participating in the blockchain.

The operation of the file transmission system according to the present embodiment will be described below.

First, an operation of transmitting a file from the user terminal 30 outside the intranet 20 to the user terminal 22 inside the intranet will be described. Hereinafter, a file to be transmitted is referred to as a "target file."

The target file may be stored in the user terminal 30 or in a network storage (not shown) other than the public cloud 40 outside the intranet 20. When a user (i.e., a sender) of the user terminal 30 completes input of information (selection of a target file, recipient identification information) necessary for transmission of the target file, the target file is distributed and stored in the public cloud 40.

Distributed storage related processing for distributed storage of the target file may be performed by the user terminal 30 or by a distributed storage processing device (not shown) of the public cloud 40. The distributed storage processing device is a computing device connected to the storage nodes 41, which may control the operations of the storage nodes 41, serve as a gateway for input/output data of the storage nodes 41 or monitor the operation of the storage nodes 41.

When the user terminal 30 performs the distributed storage related processing, if the target file is stored in a network storage (not shown) other than the public cloud 40 outside the intranet 20, the user terminal 30 will download the target file from the network storage before being stored in the public cloud 40.

Figure 5:
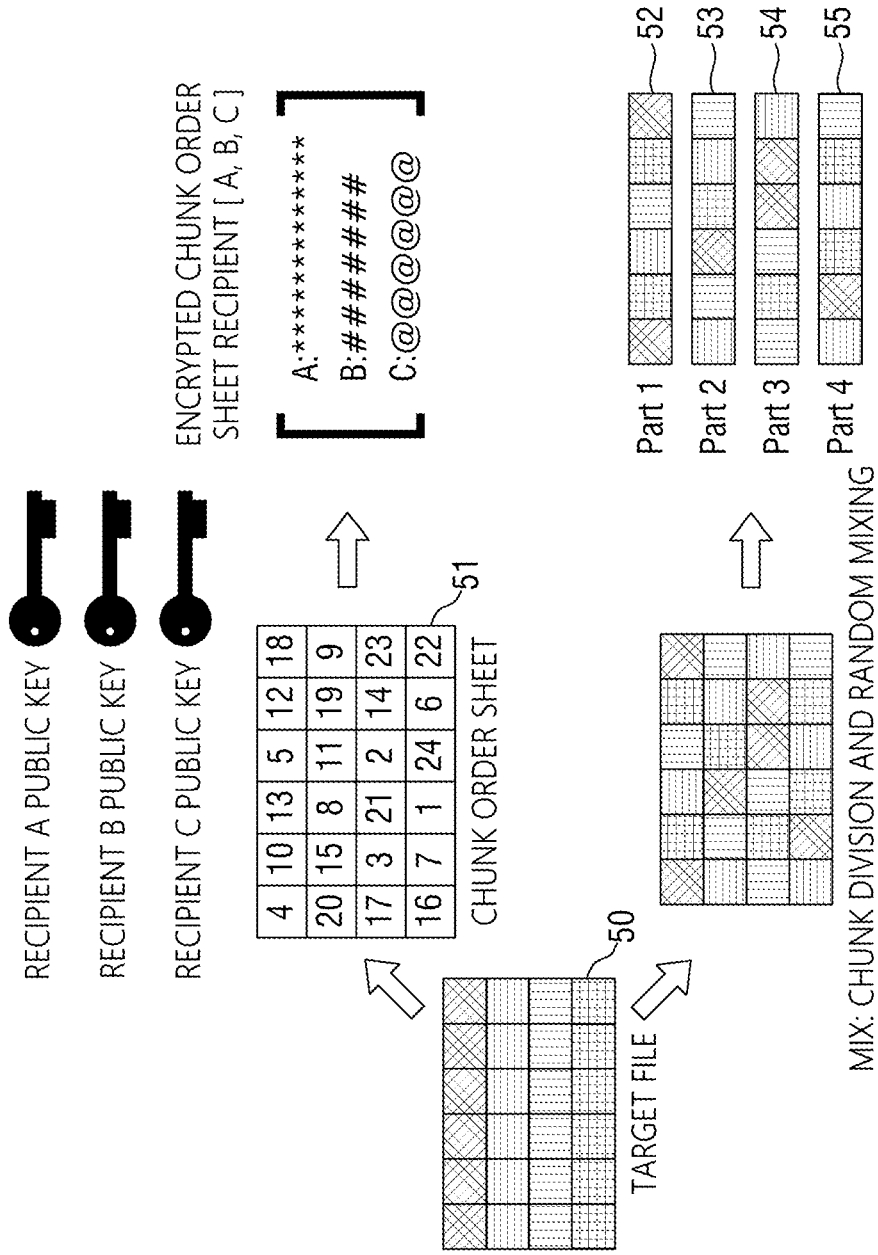
FIG. 5 is a conceptual diagram illustrating that distributed storage related processing is performed on a transmission target file in some embodiments of the present invention.

The distributed storage processing device may perform the distributed storage related processing. In this case, after the target file is transmitted to the distributed storage processing device, the distributed storage related processing will be performed in the distributed storage processing device. The distributed storage processing process will be described later in detail with reference to FIG. 5.

When the distributed storage processing is completed, the chunk storage location information in the public cloud 40 and the encrypted chunk order sheet for each recipient are obtained. The first node 11 receives a file transmission request including the encrypted chunk order sheet, information on the target file and recipient information. The first node 11 may receive the file transmission request directly from the user terminal 30 or from the user terminal 30 via a blockchain service server (not shown).

The file transmission request may be a transaction proposal of a hyper ledger fabric. Replies from endorsing peers to the file transmission request are collected, and as a result, if it is determined that the agreement is successful, a first transaction including information included in the file transmission request and chunk storage location information can be stored in the ledger of the first node 11. As a result, according to the synchronization of the ledger, the first transaction will also be stored in the ledger of the second node 12.

The process, in which the first transaction stored in the first node 11 outside the intranet 20 is also stored in the second node 12 inside the intranet 20, will be understood as a process that information that the transmitted file exits is naturally flowed into the intranet 20 according to the operation protocol of the blockchain network 10. That is, any device inside the intranet 20, which can access the ledger of the second node 12, may naturally encounter information that the transmitted file exists. Among devices inside the intranet 20, a device that can access the ledger of the second node 12 is a notification server 24 shown in FIG. 3.

Figure 3:
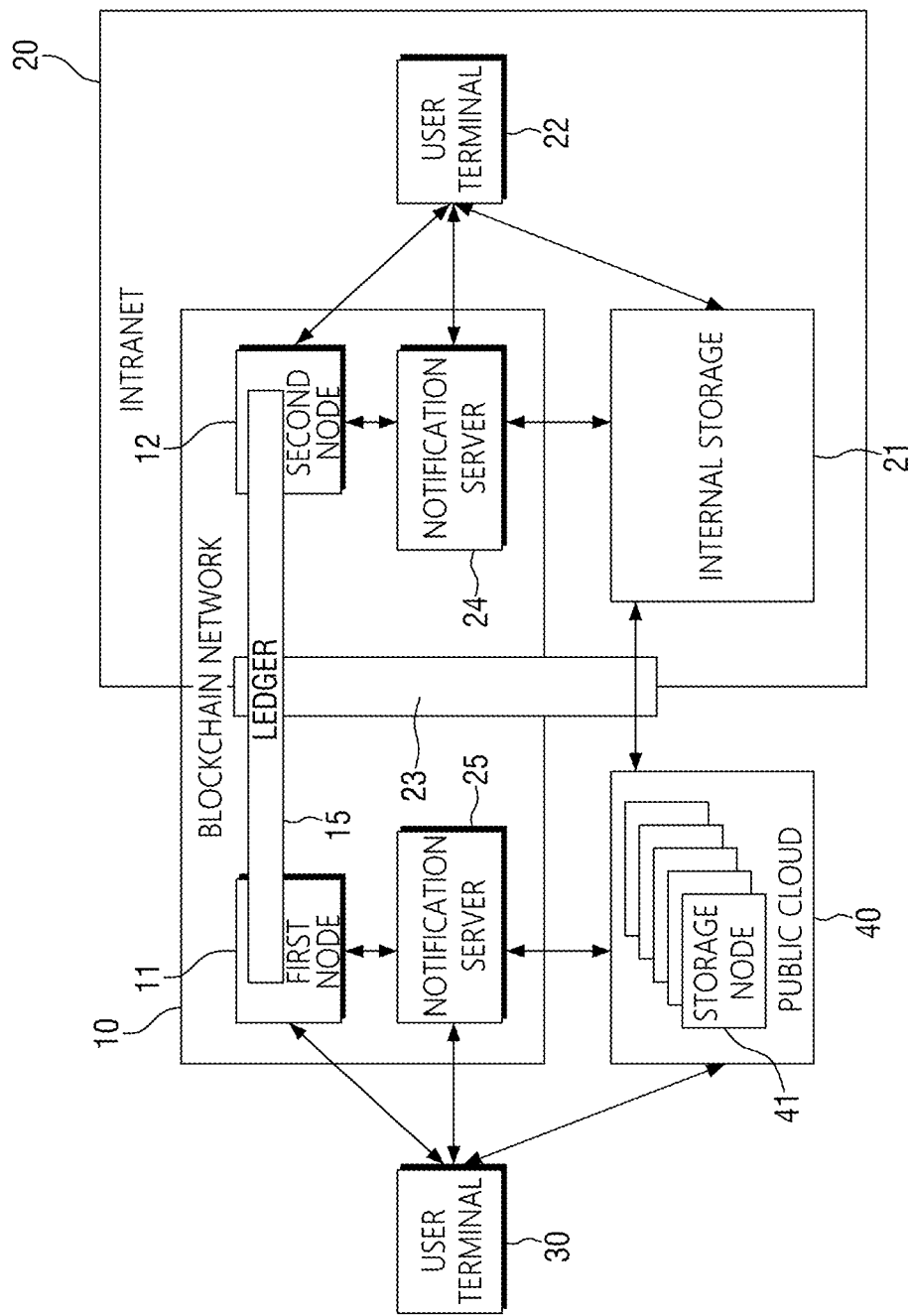
FIG. 3 is a block diagram of a modified embodiment of the blockchain based file transmission system described with reference to FIG. 1.

FIG. 3 is a block diagram of a modified embodiment of the blockchain based file transmission system described with reference to FIG. 1. As shown in FIG. 3, the file transmission system according to the present embodiment may include the notification server 24 for monitoring the ledger 15 inside the intranet 20 to detect whether a file transmission transaction including a user belonging to the intranet 20 as a recipient occurs.

Further, in some embodiments, the file transmission system according to the present embodiment may further include a notification server 25 for monitoring ledger 15 outside the intranet 20 to detect whether a file transmission transaction including a user outside the intranet 20 as a recipient occurs. The notification server 25 may be implemented on a public cloud system. However, if an intranet is established in each of the organizations, to which a blockchain node outside the intranet 20 belongs, and the intranet also includes a notification server, a notification server that performs a duplicate function may not be necessary in a public cloud system.

As a result of monitoring by the notification server 24, when the recipient information included in the first transaction includes a user belonging to the intranet, the chunk of the target file received from the public cloud is stored in the internal storage using the chunk storage location information of the first transaction. Further, the encrypted chunk order sheet is decrypted using the private key of the recipient, and the target file is restored by connecting chunks of the target file stored in the public cloud in the order according to the decrypted chunk order sheet. The restoration process of the target file will be described later in detail with reference to FIG. 7.

Next, an operation of transmitting a file from the user terminal 22 inside the intranet to the user terminal 30 outside the intranet 20 will be described.

When the user (i.e., the sender) of the user terminal 22 completes input of necessary information (selection of the target file, recipient identification information) for transmission of the target file, the user terminal 22 performs a transformation process for the stored target file to be exported to the outside of the intranet 20.

The transformation process includes dividing the target file into a plurality of chunks and randomly mixing the location of each chunk. The target file, in which the location of each chunk is rearranged, is divided into a plurality of parts. Each part is distributed and stored in the public cloud 40 so that a certain level of security is secured even if the target file is exported to the public cloud 40 having a low security level.

Further, the user terminal 22 generates data to be included in a transaction for file transmission. That is, the user terminal 22 generates an encrypted chunk order sheet, in which the chunk order sheet, which is information about the order of chunks rearranged in the target file, is encrypted with the recipient public key. The user terminal 22 proposes to the second node 12 that a second transaction comprising the encrypted chunk order sheet and recipient information is stored in the ledger. The second transaction will be added to the ledger if the proposal obtains a proposal acceptance of each endorsing peer to a level that conforms to an endorsement policy. That is, not only the second node 12 but also the first node 11 will further store the second transaction.

When the notification server 25 that monitors the first node 11 detects the addition of the second transaction, in which the user outside the intranet 20 is the recipient, a file transmission notification message is transmitted to the user terminal 30 that is the terminal of the recipient.

In some embodiments, in response to the file transmission notification message, only when the target file request is replied from the user terminal 30, the public cloud 40 may distribute and store each of the chunks received from the internal storage in each of the storage nodes. In this case, by delaying the export of the target file to the outside of the intranet 20 as much as possible, it can yield the effect of preventing as much as possible the information inside the intranet 20 from being unnecessarily exported to the public cloud 40 having a low security level.

When the distributed storage is completed in the public cloud 40, the notification server 25 may update the second transaction so that the storage location information of each chunk in the public cloud 40 according to the distributed storage is further included in the second transaction.

Hereinafter, a file transmission method between a public cloud and an intranet according to another embodiment of the present invention will be described with reference to FIG. 4. The method according to this embodiment may be performed by one or more computing devices. Further, although not otherwise mentioned, it should be noted that the technical aspects of the file transmission system according to the embodiment described with reference to FIGS. 1 to 3 may be applied to the method according to the present embodiment. In order to avoid obscuring the gist of the specification, redundant descriptions of the technical aspects already described with reference to FIGS. 1 to 3 will be omitted.

Figure 4:
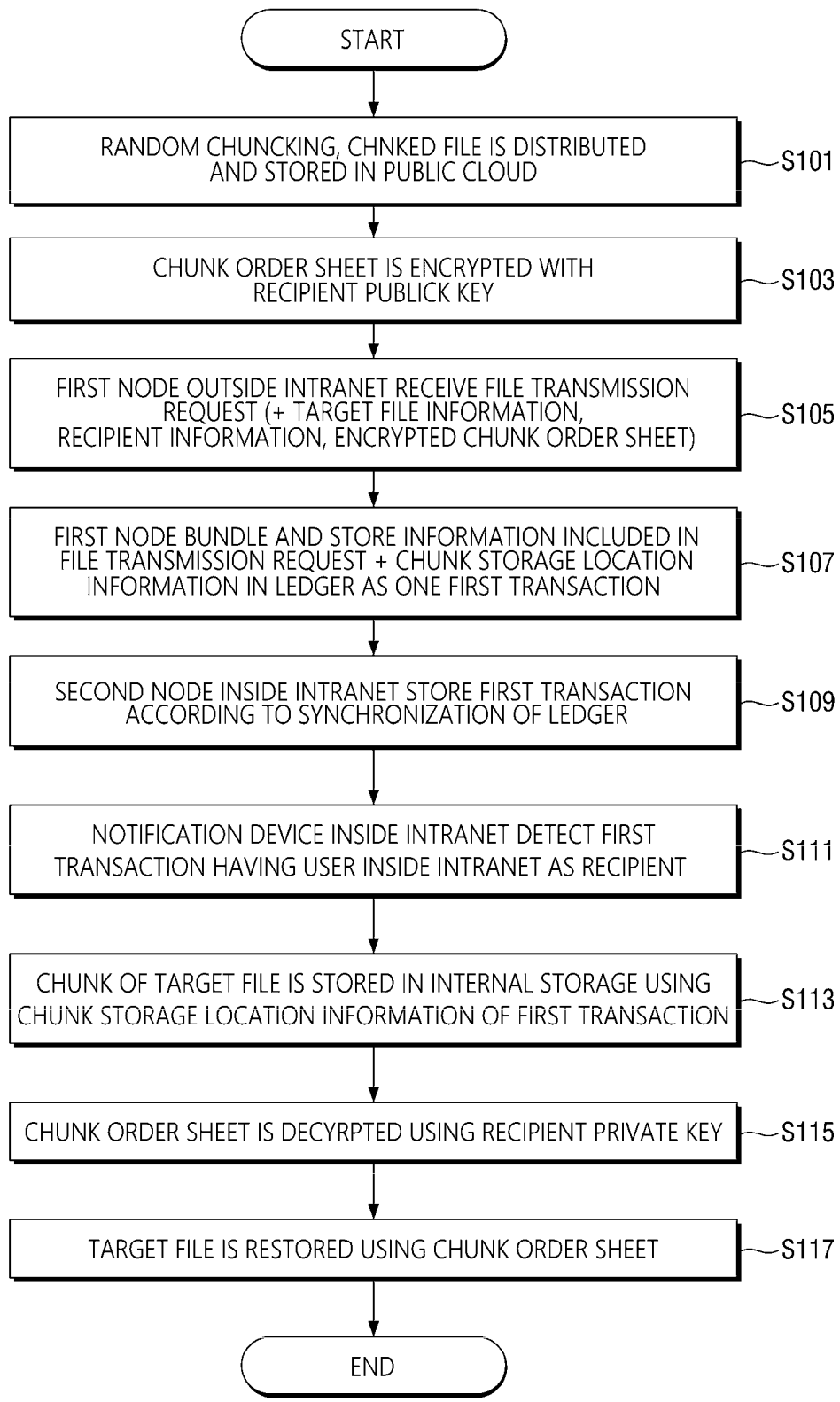
FIG. 4 is a flowchart illustrating a case, where a file is transmitted in the direction of an intranet from a public cloud in a method of transmitting a file between a public cloud and an intranet according to another embodiment of the present invention.

It can be appreciated that the method according to the flowchart of FIG. 4 is a file transmission method from the public cloud to the intranet.

In step S101, each chunk of the target file is divided and the locations of the chunks are rearranged randomly (random chunking). The chunk order sheet generated by the random chunking is information that can be used to restore the original target file, and is encrypted with the recipient public key (S103). Therefore, the chunk order sheet can only be decrypted by the recipient with the recipient secret key.

Further, each part of the target file formed according to the random chunking is distributed and stored in a public cloud. Hereinafter, the distributed storage processing process will be described with reference to FIG. 5.

The target file 50 is broken up into a plurality of chunks for distributed storage. Each chunk may have the same size or may have a different size. Since the location of each chunk is relocated, it is difficult to restore to the target file 50 even if the chunks are leaked. The location of each chunk may be rearranged randomly.

The chunk order sheet 51, in which the order of each chunk is described, is encrypted with the public key of the recipient, and the encrypted chunk order sheet is stored in the ledger.

The encrypted chunk order sheet can be decrypted only with the private key of each recipient, and since the original target file cannot be restored without the chunk order sheet 51, it is guaranteed that the original target file can only be restored by the recipient.

At this time, when there are a plurality of recipients, all of the encrypted chunk order sheets are stored in the ledger with the public key of each recipient. In the example shown in FIG. 5, when the recipients are three of A, B and C, the result of encrypting the chunk order sheet 51 with the recipient A public key, the result of encrypting the chunk order sheet 51 with the recipient B public key and the result of encrypting the chunk order sheet 51 with the recipient C public key are included in one transaction and stored in the ledger.

Since the same processing is guaranteed for the data contained in one transaction in the blockchain, when a sender transmits a file to a plurality of recipients, the success/failure of the file transmission is equally applied to all recipients. Further, since the same chunk order sheet 51 is provided to all the recipients and the same chunked target file in the mixed chunk order is also provided to all the recipients, when the sender transmits a file to a plurality of recipients, the effect of ensuring the sameness of the transmission result and the transmission target file is obtained.

In some embodiments, to increase security, random chunking may be performed separately for each recipient. It will be described with reference to FIG. 2. It is supposed that a first recipient belongs to organization B 2 and a second recipient belongs to organization C 3. The first transaction may include an encrypted chunk order sheet encrypted with the public key of the first recipient, storage location information of the chunk according to the result of the chunking performed for the first recipient, an encrypted chunk order sheet encrypted with the public key of the second recipient, the storage location information of the chunk according to the result of the chunking performed for the second recipient and the recipient information. In this case, as a result of the first recipient leaking the chunk order sheet to another user (not the second recipient) of organization C 3, the effect of complementing security vulnerability that another user of organization C 3 obtains the original target file is yielded. On the other hand, the present embodiment consumes a lot of computational resources in that an operation of chunking and mixing each chunk location for each recipient should be performed. In consideration of this, constraints, such as authentication pass, qualification retention and size limitation of a target file, may be given to execute a function of performing random chunking for each recipient.

Figure 6:
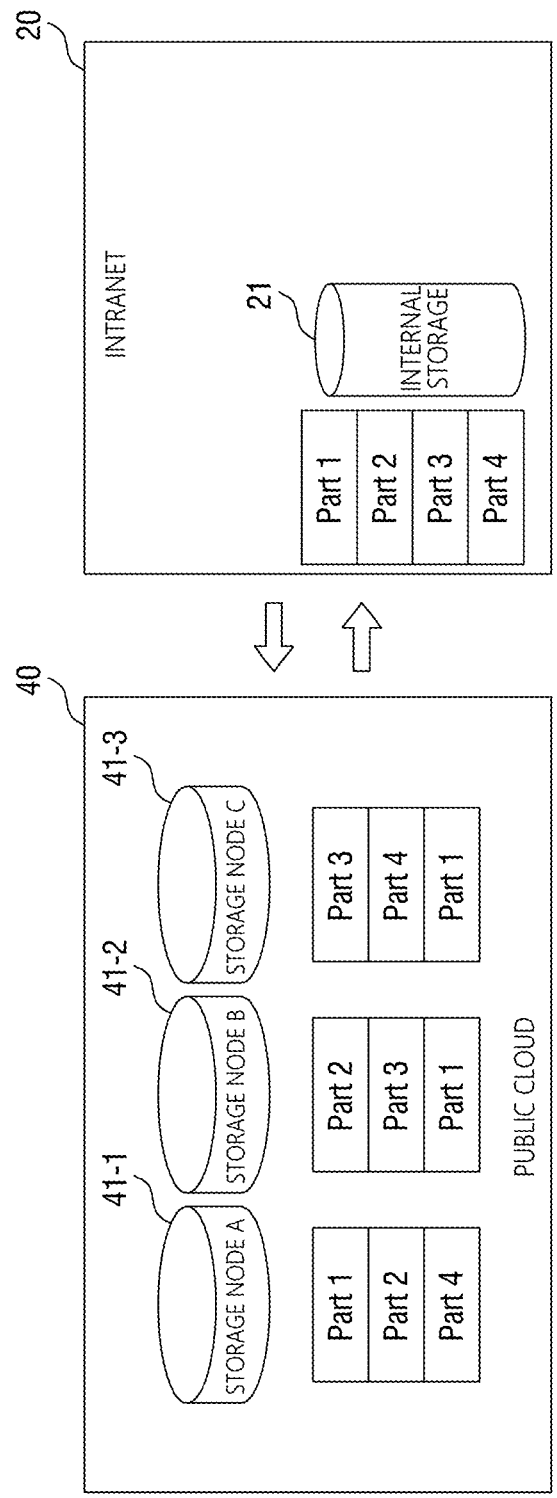
FIG. 6 is a conceptual diagram illustrating a target file is distributed and stored in a public cloud and stored as one set in an internal storage inside an intranet in some embodiments of the present invention.

Next, the target file, whose location is rearranged, is divided into a plurality of parts. Further, the number N of storage nodes may be 3 or more. This is to prevent the chunks of the target file from being identically copied and stored when the number N of storage nodes is 2. The number T of parts may be larger than the number N of storage nodes. That is, it may be T>=N+1. This is to prevent at least one of all parts constituting the target file from being stored in the storage node. In this regard, FIG. 6 illustrates that any of storage nodes 41-1, 41-2, 41-3 does not store all four parts. That is, not each one of the parts, but a plurality of the parts may be distributed and stored on each of the storage nodes 41-1, 41-2, 41-3, but as a result of the distributed storage, at least one part may be omitted in one storage. In other words, each part or its copy is distributed and stored in each of the storage nodes 41-1, 41-2, 41-3, but it can be stored to omit at least one part constituting the target file in one storage node.

In some embodiments, each storage node 41-1, 41-2, 41-3 may add parity data, which is encrypted with the public key of the storage node 41-1, 41-2, 41-3, to each part and store it. The public key of each storage node may be stored in the ledger. Encrypted parity data added to each part can be decrypted with the secret key of each storage node, and the parity data can be used to verify the integrity of each part. The secret key of the storage node may be stored in a secure area of the storage node.

In some embodiments, the storage nodes 41-1, 41-2, 41-3 of the public cloud 40 may operate based on Redundant Array of Independent Disks (RAID) Level 5. As widely known, RAID level 5 does not limit parity area to a specific disk, but rather spreads them across multiple disks. And thus, if there is an error in data read from a specific storage node, the data is recovered through information obtained from a storage node, in which the location corresponding to the area where the data is recorded is designated as parity area.

As described above, since the number N of storage nodes should be three or more, it satisfies the standard of RAID level 5. Therefore, by distributing and storing the chunks of the target file in the storage nodes 41-1, 41-2, 41-3 operating based on the standard of RAID level 5, even if one of the storage nodes 41-1, 41-2, 41-3 fails, data loss or corruption can be prevented.

Each part of the target file is distributed and stored in the public cloud 40 as described, but when the target file is stored in the internal storage 21 of the intranet 20, each part constituting the target file may be stored in a sequentially connected form, as shown in FIG. 6. Since the internal storage 21 of the intranet 20 has a high level of security, even if all the parts constituting the target file are stored in a sequentially connected form, a security problem does not occur. Therefore, the internal storage 21 of the intranet 20 can connect and store all the parts constituting the target file as one set in order to increase the processing speed related to the target file.

Returning back to FIG. 4, the process will be described.

In step S105, the first node outside the intranet receives a file transmission request. In step S107, a transaction for the file transmission request is added to the ledger stored by the first node. The transaction for the file transmission request may include meta information of the target file, recipient identification information, an encrypted chunk order sheet (encrypted with the recipient public key for each recipient) and chunk storage location information. In step S109, the second node inside the intranet also adds the transaction to the ledger.

In step S111, the notification server inside the intranet detects that a new transaction having a user inside the intranet as a recipient has been added to the ledger, and uses the chunk storage location information included in the new transaction to store the chunk of the target file in the internal storage (S113). In this case, the internal storage may store each part of the target file adjacent to each other in order, thereby increasing the computation speed and the efficiency of the storage space.

In some embodiments, storing the chunk of the target file in the internal storage may be performed only after obtaining acknowledgment from the terminal of the first user as to whether the file is received. In this case, the effect of preventing the suspicious file data from flowing into the intranet as much as possible is yielded.

Next, when a situation, such as requesting access to the target file from a recipient application, occurs, the original of the target file is restored. In step S115, the chunk order sheet is decrypted using the recipient private key, and the target file is restored using the chunk order sheet (S117).

Figure 7:
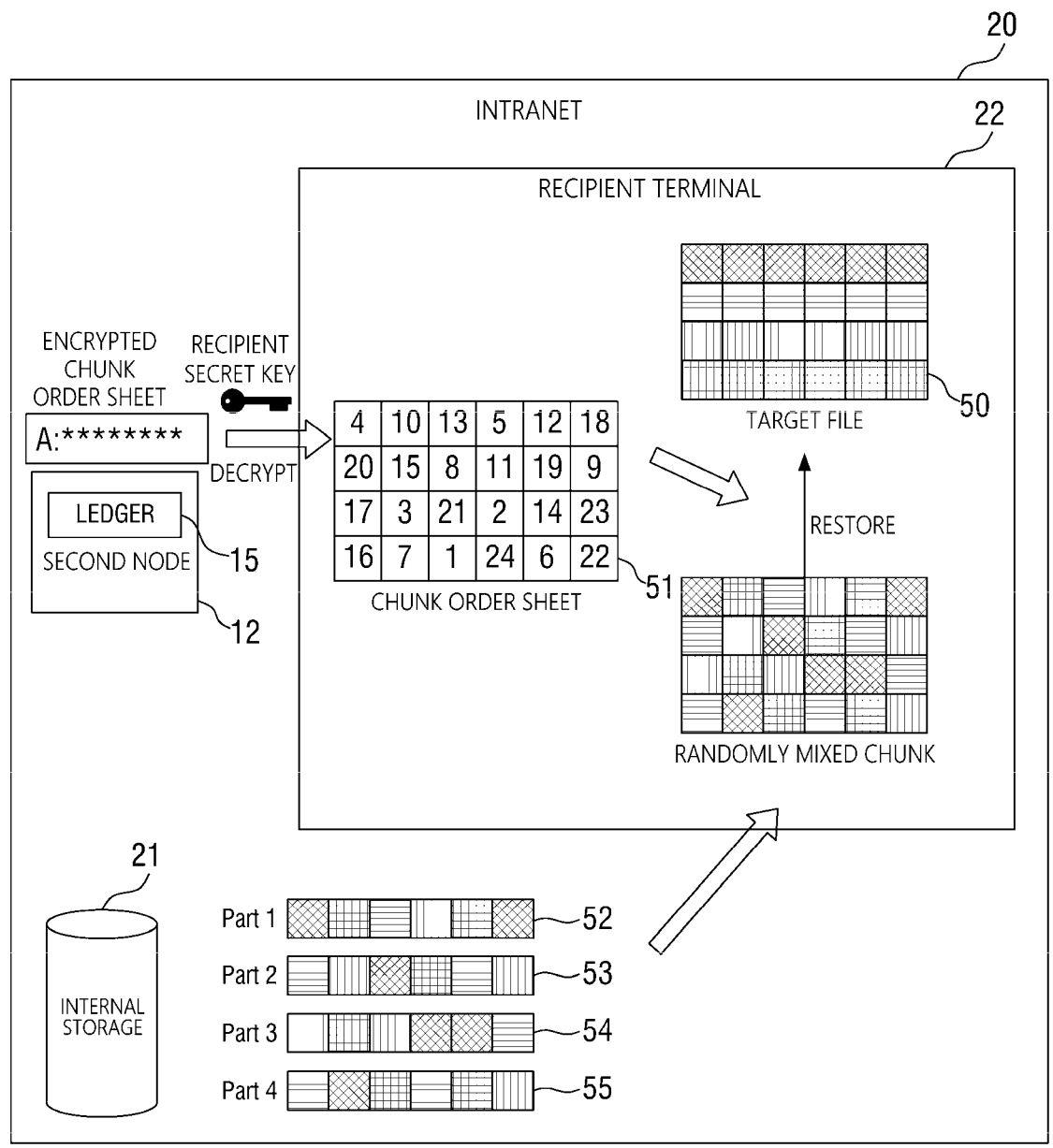
FIG. 7 is a conceptual diagram illustrating a process of restoring an original of a target file in a recipient terminal inside an intranet in some embodiments of the present disclosure.

In detail, referring to FIG. 7, when each of parts 52, 53, 54, 55 of the target file stored in the internal storage 21 is sequentially connected, data including chunks of randomly mixed order is obtained. In the transaction included in the ledger 15 stored by the second node 12, an encrypted chunk order sheet of a file transmission transaction, in which the user of the recipient terminal 22 is designated as the recipient, is obtained. The encrypted chunk order sheet is decrypted with the recipient secret key. The recipient secret key may be stored in a secure area of the recipient terminal, may be obtained by using biometric information obtained from the biometric information sensor of the recipient terminal, or may be directly input to the recipient terminal 22. The target file 50 is restored by rearranging the order of the chunks using the decrypted chunk order sheet 51.

The original target file restoration process described with reference to FIG. 7 may be performed in the recipient terminal 22 when a situation, such as requesting access to the target file from a recipient application, occurs.

Meanwhile, the original target file restoration process may be performed immediately after each part 52, 53, 54, 55 of the target file is stored in the internal storage 21. That is, in the internal storage 21 of the intranet 20 having high security level, the original of the target file can be stored as it is. In this case, by performing the original restoration of the target file 50 on the recipient terminal 22, a delay in the display of the contents of the target file is prevented.

When the original of the target file is stored in the internal storage 21 as it is, the sender selects the internal storage storing type option value as a value indicating the original file storing type so that a case, in which the internal storage storing type option value is included in the transaction and stored in the ledger 15, and a case, in which the sender designates the entire organization operating the intranet 20 as a recipient, and the like may be considered.

Hereinafter, a file transmission method between a public cloud and an intranet according to another embodiment of the present invention will be described with reference to FIG. 8. The method according to this embodiment may be performed by one or more computing devices. Further, it should be noted that the technical aspects according to the embodiment described with reference to FIGS. 1 to 7 may be applied to the method according to the present embodiment, even if not otherwise mentioned. In order to avoid obscuring the gist of the specification, redundant descriptions of the technical aspects already described with reference to FIGS. 1 to 7 will be omitted.

Figure 8:
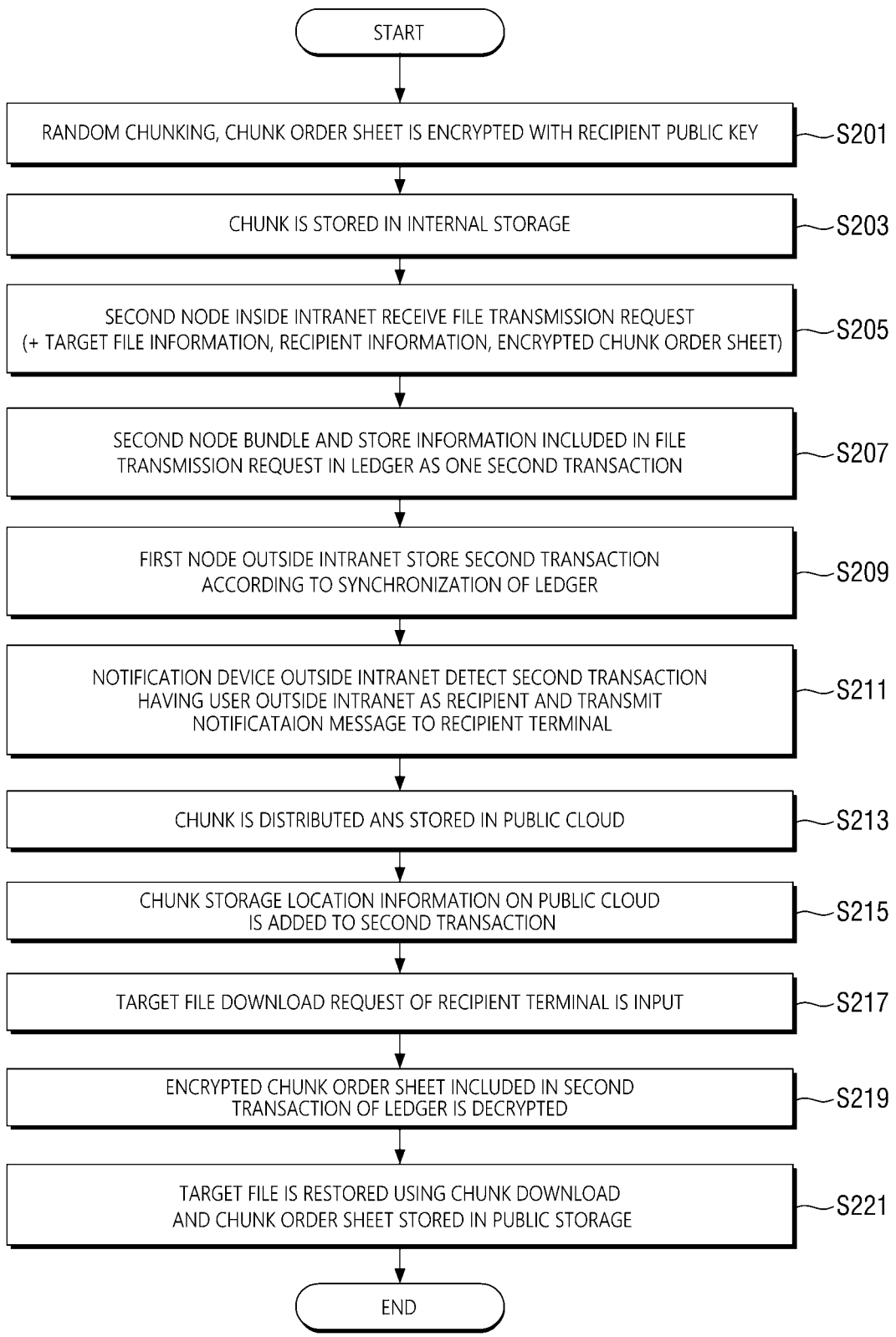
FIG. 8 is a flowchart illustrating a case, where a file is transmitted in the direction of a public cloud from an intranet in a method of transmitting a file between a public cloud and an intranet according to another embodiment of the present invention.

It can be appreciated that the method according to the flowchart of FIG. 8 is a file transmission method from the intranet to the public cloud.

In step S201, the sender terminal inside the intranet performs random chunking on the target file and encrypts the chunk order sheet reflecting the result with the recipient public key. Further, in step S203, each chunk is stored in an internal storage inside the intranet. At this time, for distributed storage of the public cloud, each part, in which data is divided according to the random chunking result, is stored in the internal storage.

In step S205, the second node inside the intranet receives the file transmission request from the sender terminal, includes the information about the file transmission request in the second transaction and stores it in the ledger (S207). The second transaction includes meta information of the target file, recipient identification information and an encrypted chunk order sheet. If there are a plurality of recipients, the encrypted chunk order sheet will be separately included in the second transaction for each recipient. As the second node adds the second transaction to the ledger, the first node outside the intranet further stores the second transaction (S209).

In step S211, the notification server outside the intranet detects the addition of the second transaction having a user outside the intranet as a recipient and transmits a notification message to the recipient terminal. In response to the notification message, when an acknowledgement message is received from the recipient terminal, each chunk of the target file may be distributed and stored in the public cloud at that time (S213). The method of distributed storage refers to the embodiment described with reference to FIG. 6. Further, unlike one shown in FIG. 8, when the chunk of the target file is stored in the internal storage (S203), the chunk of the target file may be immediately distributed and stored in the public cloud. In this case, the effect of quickly obtaining the chunk storage location information on the public cloud is yielded.

Next, in step S215, the chunk storage location information on the public cloud is added to the second transaction.

Subsequently, when there is a download request or an access request of the recipient terminal for the target file in step S217, the encrypted chunk order sheet included in the second transaction is decrypted (S219) and the original target file is restored using the chunk order sheet (S221). Steps S219 and S221 may be performed at the recipient terminal outside the intranet.

The recipient terminal may be a device that cannot access the ledger. Therefore, the meta information and the encrypted chunk order sheet of the target file may be included in the notification message transmitted to the recipient terminal in step S211. Further, the notification server may transmit the chunk storage location information on the public cloud to the recipient terminal.

Figure 9:
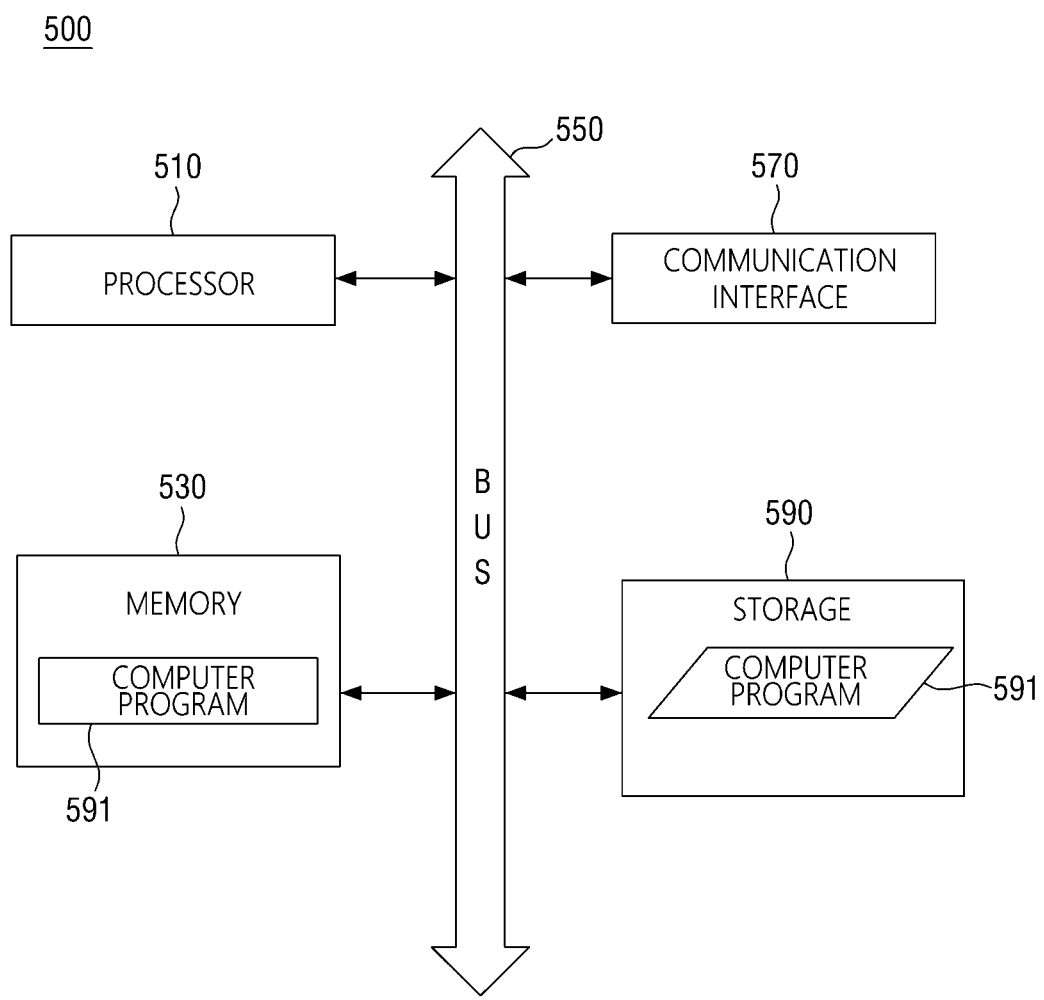
FIG. 9 is a block diagram of an exemplary computing device that may implement a device/system in accordance with various embodiments of the present invention.

FIG. 9 is an example hardware diagram illustrating a computing device 500 that can implement an apparatus and a system according to various embodiments of the present disclosure. The computing device 500 can implement blockchain nodes, notification servers, user terminals, storage nodes or internal storages disclosed on embodiments of the present disclosure.

As shown in FIG. 9, the computing device 500 may include one or more processors 510, a bus 550, a communication interface 570, a memory 530, which loads a computer program 591 executed by the processors 510, and a storage 590 for storing the computer program 591. However, FIG. 9 illustrates only the components related to the embodiment of the present disclosure. Therefore, it will be appreciated by those skilled in the art that the present disclosure may further include other general purpose components in addition to the components shown in FIG. 9.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, when the computer program 591 is loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 59 can non-temporarily store one or more computer programs 591. The storage 59 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

So far, various embodiments included in the technical features of the present disclosure and effects according to the embodiments have been described with reference to FIGS. 1 to 9. The computer readable recording medium may be, for example, a removable recording medium (CD, DVD, Blu-ray disc, USB storage device, removable hard disk) or a fixed recording medium (ROM, RAM, computer equipped hard disk). The computer program recorded on the computer readable recording medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A file transmission method between a public cloud and an intranet performed in a system comprising a blockchain network including a second node inside an intranet and a first node outside the intranet, a public cloud and an internal storage inside the intranet, the method comprising:
   storing each chunk of a target file by the public cloud;
   wherein the public cloud includes physically separated N storage nodes, where N is a natural number equal to or more than 3:
   and the storing each chunk of the target file comprises:
   dividing the target tile into a plurality of chunks by a sender terminal;
   randomly mixing a location of each chunk by the sender terminal,
   dividing data according to a result of the random mixing into T parts by the sender terminal, wherein T is a natural number equal to or more than N+1; and
   distributing and storing, by the public cloud, the respective parts or its copy in each of the storage nodes such that at least one part is omitted in one storage node;
   receiving, by the first node, a file transmission request including an encrypted chunk order sheet of the target file, information on the target file and recipient information, wherein the chunk order sheet includes connection order information of each chunk necessary for restoring the target file, and the encrypted chunk order sheet is encrypted with a public key of a recipient;
   storing a first transaction including information included in the file transmission request and chunk storage location information in a ledger stored in the first node;
   storing, by the second node, the first transaction in a ledger of the second node according to synchronization of the ledger;
   storing a chunk of the target file received from the public cloud in the internal storage using the chunk storage location information of the first transaction when the recipient information included in the first transaction includes a user belonging to the intranet; and
   decrypting the encrypted chunk order sheet using a private key of the recipient and restoring the target file by connecting chunks of the target file stored in the public cloud in an order according to the decrypted chunk order sheet.

2. The method of claim 1, wherein the receiving the file transmission request comprises receiving a file transmission request comprising recipient information including information on a plurality of recipients and information on the target file common to all recipients; and
   the first transaction comprises an encrypted chunk order sheet for each recipient encrypted with a public key of each of recipients, the chunk storage location information and the recipient information.

3. The method of claim 2, wherein the blockchain network is a consortium network, in which a plurality of organizations participated;
   the blockchain network further comprises a third node outside the intranet;
   the first node is a recording node (committing peer) belonging to a first organization of the plurality of organizations, the second node is a recording node belonging to a second organization of the plurality of organizations, and the third node is a recording node belonging to a third organization of the plurality of organizations;
   the plurality of recipients includes a first recipient belonging to the second organization and a second recipient belonging to the third organization; and
   the first transaction includes an encrypted chunk order sheet encrypted with a public key of the first recipient, storage location information of a chunk according to a result of chunking performed for the first recipient, an encrypted chunk order sheet encrypted with a public key of the second recipient, storage location information of a chunk according to a result of chunking performed for the second recipient and the recipient information.

4. The method of claim 1, wherein the chunk storage location information includes location information of each of the parts; and the storing a chunk of the target file in the internal storage comprises sequentially connecting and storing each part of the target file in the internal storage by using location information of each part of the target file.

5. The method of claim 1, wherein the distributing and storing the respective parts or its copy in each of the storage nodes such that at least one part is omitted in one storage node comprises storing, by a storage node, the respective parts or its copy, to which parity data encrypted with a public key of the storage node is added; and
   a public key of each of the storage nodes is stored in the ledger.

6. The method of claim 1, wherein the storing a chunk of the target file in the internal storage comprises:
   monitoring a ledger stored in the second node by a notification server inside the intranet; and
   transmitting a control message to cause a chunk of the target file to be stored in the internal storage when the notification server detects that a first user belonging to the intranet is included in the recipient information included in the first transaction.

7. The method of claim 6, wherein the transmitting the control message comprises:
   obtaining a confirmation of whether a file is received from a terminal of the first user in response to detecting that a first user belonging to the intranet is included in the recipient information included in the first transaction; and
   transmitting the control message by the notification server in response to obtaining the confirmation.

8. The method of claim 6, wherein the notification server is a device included in the blockchain network, but not storing the ledger.

9. The method of claim 6, wherein the first transaction further includes an internal storage storing type option value; and
   the restoring the target file comprises transmitting, by the notification server, a control message to cause the target file to be restored immediately after a chunk of the target file is stored in the internal storage if the internal storage storing type option value is a value indicating a source file storing type.

10. A file transmission method between a public cloud and an intranet performed in a system comprising a blockchain network including a second node inside an intranet and a first node outside the intranet, a public cloud and an internal storage inside the intranet, the method comprising;
wherein the public cloud includes physically separated N store e nodes, where N is a natural number equal to or more than 3;
dividing a target file into a plurality of chunks by a sender terminal inside the intranet;
randomly mixing, by the sender terminal, a location of each chunk; and
dividing data according to a result of the random mixing into T parts by the sender terminal, wherein T is a natural number equal to or more than N+1; and
encrypting a chunk order sheet reflecting the result with a public key of a second user who is a recipient;
storing a second transaction including an encrypted chunk order sheet of the target file and recipient information in a ledger stored in the second node;
storing the second transaction in a ledger of the first node according to synchronization of the ledger by the first node;
distributing and storing, by the public cloud, the respective parts or its copy in each of the storage nodes such that at least one part is omitted in one storage node:
receiving, by the first node, chunk storage location information from the public cloud, and updating the second transaction such that the chunk storage location information is included in the second transaction.

11. The method of claim 10 further comprising:
monitoring a ledger stored in the first node by a notification server outside the intranet; and
transmitting a notification message to a terminal of the second user when the notification server detects that a second user belonging to a monitoring target organization is included in the recipient information included in the second transaction.

12. The method of claim 11, wherein the notification message includes an encrypted chunk order sheet of the second transaction and the chunk storage location information; and
the method further comprising decrypting, by a terminal of the second user, the encrypted chunk order sheet using a private key of the second user and connecting chunks of the target file stored in the public cloud in an order according to the decrypted chunk order sheet to restore the target file.

13. A blockchain based file transmission system comprising:
a first node located outside an intranet for receiving a file transmission request including information on a target file and recipient information and storing a first transaction including an encrypted chunk order sheet, chunk storage location information and recipient information of the target file in a ledger;
wherein the encrypted chunk order sheet is encrypted with a public key of a recipient;
a public cloud located outside the intranet for storing each chunk of the target file;
wherein the public cloud includes physically separated N storage nodes, where N is a natural number equal to or more than 3;
and the storing each chunk of the target file comprises:
dividing the target file into a plurality of chunks by a sender terminal;
randomly mixing a location of each chunk by the sender terminal;
dividing data according to a result of the random mixing into T parts by the sender terminal, wherein is a natural number equal to or more than N+1; and
distributing and storing, by the public cloud, the respective parts or its copy in each of the storage nodes such that at least one part is omitted in one storage node;
a second node located inside the intranet for storing the first transaction in a ledger of the second node according to synchronization of the ledger; and
an internal hardware storage located inside the intranet for storing a chunk of the target file received from the public cloud using the chunk storage location information of the first transaction when a user belonging to the intranet is included in the recipient information included in the first transaction,
wherein the target file is restored by connecting Chunks of the target file stored in the public cloud in an order according to the chunk order sheet decrypted using a private key of the recipient.

* * * * *